(No Model.)
T. A. READER.
CARPET STRETCHER.
No. 302,939. Patented Aug. 5, 1884.
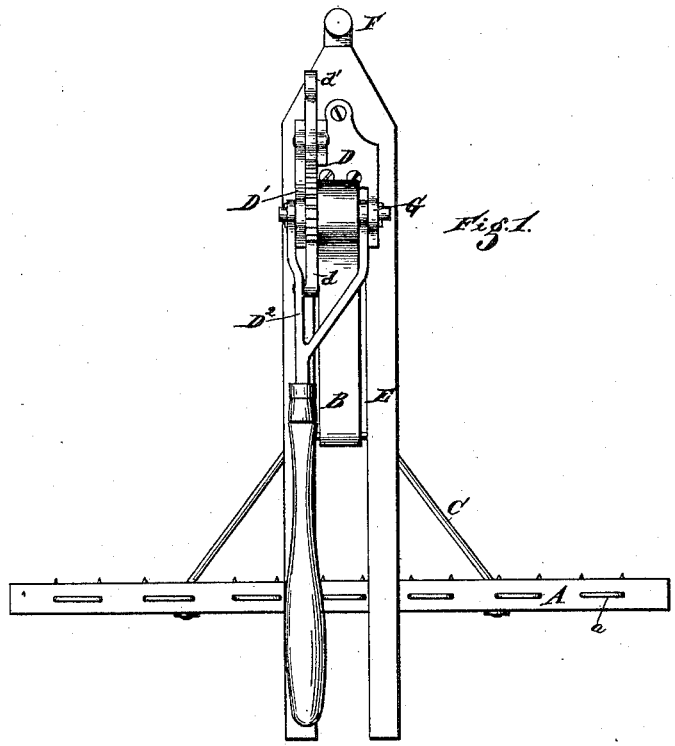
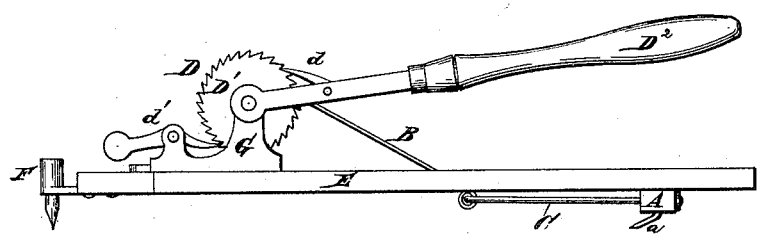
WITNESSES
INVENTOR
Thomas A. Reader
By W. W. Leggett
Attorney

UNITED STATES PATENT OFFICE.

THOMAS A. READER, OF ANN ARBOR, MICHIGAN.

CARPET-STRETCHER.

SPECIFICATION forming part of Letters Patent No. 302,939, dated August 5, 1884.

Application filed December 26, 1883. (No model.)

*To all whom it may concern:*

Be it known that I, THOMAS A. READER, of Ann Arbor, county of Washtenaw, State of Michigan, have invented a new and useful Improvement in Carpet-Stretchers; and I declare the following to be a full, clear, and exact description of the same, such as will enable others skilled in the art to which it pertains to make and use it, reference being had to the accompanying drawings, which form a part of this specification.

My invention consists of the combinations of devices and appliances hereinafter specified, and more particularly pointed out in the claims.

As illustrated in the drawings, Figure 1 is a plan view of a device embodying my invention. Fig. 2 is a side elevation of the same.

I carry out my invention as follows:

A represents the bar provided with suitable teeth or points, whereby it may be engaged with the carpet. I prefer to provide said bar with a series of staple-teeth, *a*. As thus constructed the teeth are not likely to work loose, and may be readily and economically secured to the bar by simply boring the head for their insertion.

B is a strap of any flexible material, properly secured with the head in any desired manner—as, for instance, by an intervening bail, C—by means of which the power exerted is more evenly conveyed through the entire length of the bar. This strap is secured at its opposite end to a suitable winding-drum, as shown at D, said drum provided with a ratchet, D', a lever of any suitable construction, D², and with suitable pawls. As shown at *d*, the lever may be provided with a forcing-pawl. *d'* is a stop-pawl. I do not limit myself, however, to this precise mechanism for rotating the drum, as it may be done in any suitable manner without departing from the principle of my invention.

E is any suitable supporting-frame.

F is any suitable spike or point whereby the device may be secured to the floor at the edge. I prefer to construct this as shown in Fig. 2, in which the spike is provided with an upwardly-extended head, and with an arm secured upon the frame.

The drum may be provided with any suitable bearing, G, attached to the frame.

The operation of the device is apparent. The device is first engaged to the floor by means of the spike F, and to the carpet by means of the toothed bar A, when by rotating the drum the strap is wound thereon, and the carpet is stretched, the stop-pulley holding the drum in any given position, and effectually preventing any slacking of the carpet when a new purchase of the lever is made.

The distance at which the bar may be secured to the carpet in rear of the drum may readily be regulated, as desired, either by letting out the entire strap at the outset or by first having it partially wound upon the drum when the bar is engaged with the carpet.

This mechanism is simple and economical in its construction, and is also ready and efficient in its operation.

What I claim is—

1. The combination of a frame, E, having means at one end for holding it in a stationary position, and carrying a winding drum, and mechanism for operating said drum, with a slidable tooth-bar and a flexible connection between said slidable bar and the winding-drum on the frame, substantially as described.

2. The combination of a frame, E, having a spike or point, F, at one end to hold it in a stationary position, and carrying a winding-drum, and mechanism for operating said drum, with a slidable toothed bar transverse to the frame, and a flexible connection between said slidable bar and the winding-drum on the frame, substantially as described.

3. A carpet-stretcher consisting of a toothed bar provided with a bail, C, having a flexible connection with a winding-drum, mechanism for operating the drum, and in combination therewith a supporting-frame, substantially as described.

4. A carpet-stretcher consisting of a bar provided with staple-teeth *a*, said bar having flexible connection with a winding-drum, mechanism for operating said drum, and in combination therewith a supporting-frame, and means for engagement with the floor, substantially as described.

In testimony whereof I sign this specification in the presence of two witnesses.

THOMAS A. READER.

Witnesses:
N. S. WRIGHT,
M. B. O'DOGHERTY.